United States Patent [19]

Porter et al.

[11] 4,016,658
[45] Apr. 12, 1977

[54] VIDEO GROUND-BASED FLIGHT SIMULATION APPARATUS

[75] Inventors: Arthur Paul Porter, Haywards Heath; James William Morris, Lewes; Roy Alfred George Gasson, Crawley, all of England

[73] Assignee: Redifon Limited, England

[22] Filed: Dec. 24, 1974

[21] Appl. No.: 536,242

Related U.S. Application Data

[63] Continuation of Ser. No. 239,192, March 29, 1972, abandoned.

[30] Foreign Application Priority Data

Apr. 2, 1971   United Kingdom ............... 8509/71

[52] U.S. Cl. .......................... 35/12 N; 178/DIG. 35
[51] Int. Cl.² ......................................... G09B 9/08
[58] Field of Search ............. 35/12 R, 12 B, 12 W, 35/12 C, 12 N, 12 K, 12 S, 12 L, 10.2; 178/6.8, DIG. 35; 235/150; 340/27 NA

[56] References Cited

UNITED STATES PATENTS

| | | | |
|---|---|---|---|
| 3,327,407 | 6/1967 | Barnes | 35/12 N |
| 3,401,228 | 9/1968 | Barnes | 35/12 N X |
| 3,422,207 | 1/1969 | Flower et al. | 35/12 N X |
| 3,515,802 | 6/1970 | Wise | 35/12 N X |
| 3,520,994 | 7/1970 | McAffee et al. | 35/10.2 |
| 3,524,019 | 8/1970 | Coen | 35/12 N |
| 3,603,962 | 9/1971 | Lechner | 178/6.8 X |
| 3,605,083 | 9/1971 | Kramer | 340/27 NA |
| 3,826,864 | 7/1974 | Paufve | 35/12 N X |

*Primary Examiner*—Richard C. Pinkham
*Assistant Examiner*—Vance Y. Hum
*Attorney, Agent, or Firm*—Larson, Taylor and Hinds

[57] ABSTRACT

A ground-based flight simulator having a television type terrain visual display with simulated weather conditions. The visibility of the terrain image is varied over the picture area to simulate ground fog and cloud conditions, either one alone or both together. Either weather condition provides a zone of transitional visibility, i.e., spatially changing visibility between spaced zones of uniform visibility, e.g., between one of uniformly clear visibility and another zone of uniformly zero visibility. The transitional zones may be varied in width according to aircraft pitch and the entire weather pattern rotated, together with simulated terrain, according to aircraft roll.

5 Claims, 7 Drawing Figures

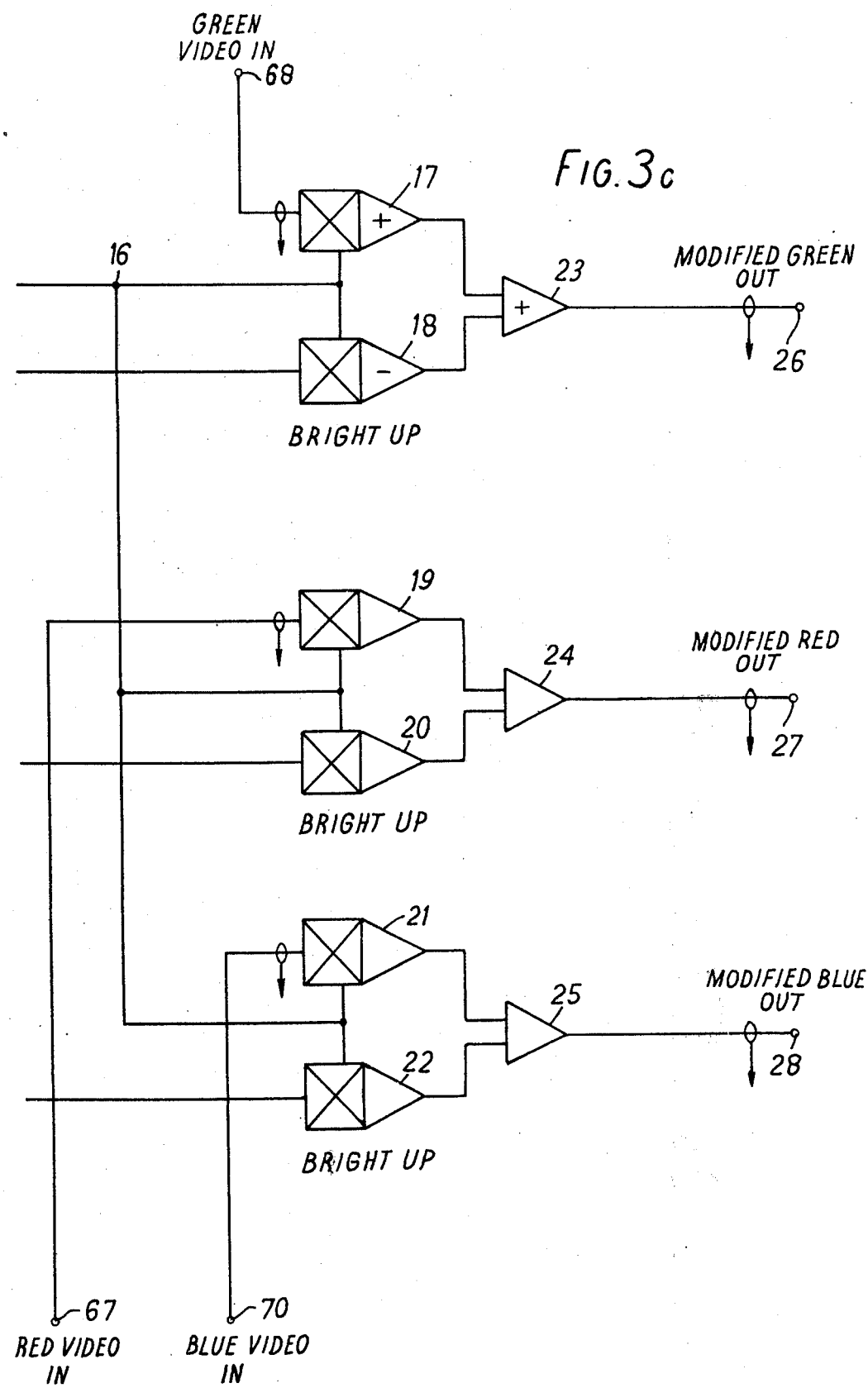

VIDEO GROUND-BASED FLIGHT SIMULATION APPARATUS

This is a continuation of application Ser. No. 239,192 filed Mar. 29, 1972, now abandoned.

This invention relates to ground-based flight simulation apparatus having a dummy cockpit including flight controls and flight instruments and an associated flight computer for continuously computing values relating to a simulated flight. Further, a visual display is provided simulating, for trainee air crew in the cockpit, an actual view of terrain over which a simulated flight is taking place. The present invention relates particularly to this visual display.

Normally in such apparatus the cockpit is moved to reproduce the accelerations occurring during a simulated flight. The present invention will normally be used with such apparatus, but, as will be understood from the description which follows, it is not necessary to move the cockpit in order to put the invention into practice.

Ground-based flight simulation apparatus of the type described is known in which the visual display is provided by a closed-circuit television system having a camera which views and is moved in relation to a scale model of the terrain and a television receiver which projects an image of the terrain scene viewed so that it is visible to the trainee crew. The present invention may be used particularly with such apparatus and generally with apparatus having a television system visual display.

A problem with visual display systems is to simulate realistically the visual effect of ground fog, mist, low cloud and like atmospheric conditions.

The object of the present invention is to provide a television-based visual display system which gives improved simulation of such atmospheric conditions.

Accordingly, the invention provides ground-based flight simulation apparatus including a dummy cockpit and associated flight computer and visual display means including a television system for producing a scanned image in a picture area visible from said flight deck, circuit means controlling the line and frame scanning of said image for defining first and second boundaries spaced apart on said scanned image, controlled-gain signal amplifier means for providing a full detail visual image in the picture area on one side of the first boundary, zero detail visual image in the picture area on the other side of the second boundary and progressively reduced detail visual image from the first boundary line to the second boundary line and circuit means controlled from said flight computer for inclining said boundaries in accordance with computed aircraft roll and for displacing said boundaries in accordance with computed aircraft pitch.

It will be appreciated that the embodiment of the invention defined above provides for the simulation of either low cloud or ground fog conditions. For low-cloud conditions, there will be a sky area in which visibility is zero, a ground area in which visibility is clear and an intermediate area of visibility increasing downwardly. For ground fog conditions, there will be a ground area in which visibility is zero, a sky area in which visibility is clear and an intermediate area of visibility increasing upwardly.

When both conditions are simulated together, there will be four boundaries defining a single area of clear visibility, both sky and ground areas of zero visibility and two area of transitional visibility.

In such an embodiment of the invention, there are provided circuit means for defining first, second, third and fourth boundaries spaced apart on said scanned image, controlled-gain signal amplifier means for providing a full-detail visual image in the picture area between the second and third boundary lines, zero-detail visual image in the picture area lying outside the first and fourth boundaries and progressively reduced detail visual image from the second boundary to the first boundary and from the third boundary to the fourth boundary and circuit means controlled from said flight computer for inclining all said boundaries in accordance with computed aircraft roll and for displacing said first and second and said third and fourth boundaries in accordance with computed aircraft pitch.

In order that the invention may be readily put into practice, one embodiment will now be described in detail, by way of example, with reference to the accompanying drawings of which:

FIGS. 3a, 3b and 3c are adjacent sheets of drawing showing a schematic circuit diagram illustrating an embodiment of the invention using a three colour channel natural-colour television system;

Figure 1:
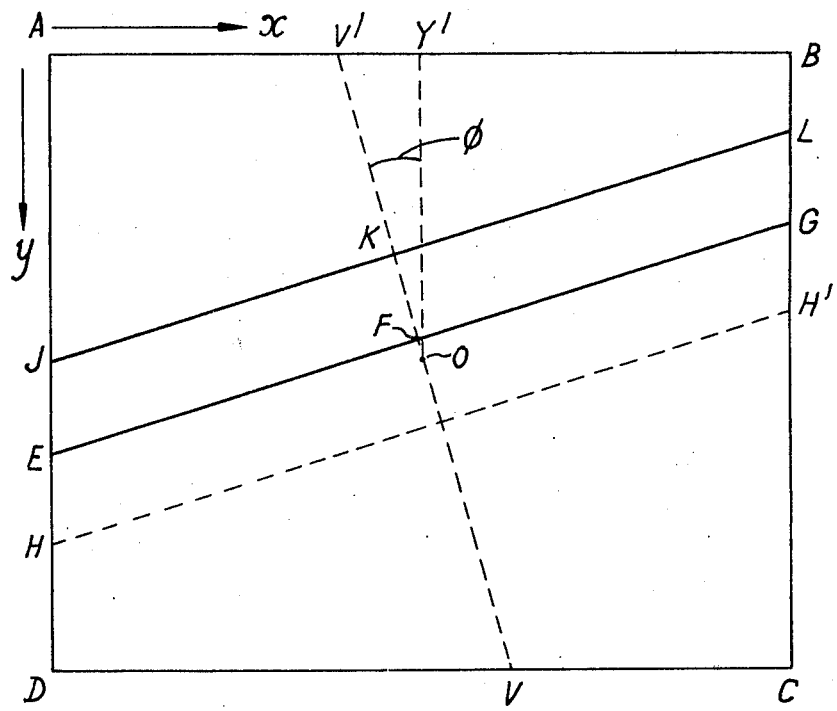
FIG. 1 is a diagram representing a rectangular television raster and showing a cloud-base or ground fog boundary.

In FIG. 1, the rectangle A, B, C, D represents the picture area and format of the television visual display which is visible from the flight deck of a flight simulator. The positive direction of line scan and of frame scan is shown by the arrows $x$ and $y$, respectively.

The centre of the picture area is shown by the point O and the vertical axis of the flight deck through the point O is represented by the line O, Y.

The horizon shown in the visual display is represented by the line H, H' and the terrain vertical through point O is represented by the line V, V'. Thus, in FIG. 1, the attitude of the aircraft simulated is pitched upwards and with right-hand roll angle $\phi$.

Cloud or ground fog to be simulated is, in these examples, characterised by two boundaries between which there is progressive decrease of visibility. Before the first boundary, there is clear visibility and beyond the second boundary there is zero visibility. In FIG. 1, the two boundaries are represented by the lines E, F, G and J, K, L.

Thus, referring to FIG. 1 and to cloud conditions, all the area C, D, H, H' represents zone or area of clear visibility, that is the entire ground zone or area C, D, H, H' has clear visibility as has the sky zone or area H', H, E, F, G. The area G, F, E, J, K, L is the transition area of diminishing visibility in the upwards direction and the picture area L, K. J. A, B is an area of zero visibility.

Considering, now FIG. 1 and ground fog conditions, the picture area L, K. J, A, B is an area of clear visibility. The area G, F, E, J, K. L is a transition area of diminishing visibility in the downwards direction. The area C, D, E, F, G is an area of zero visbility so that, in particular, nothing on the ground area C, D, H, H' is visible.

The visual effect provided by the present invention is the normal clear visual display detail up to the first transition boundary and zero visual detail beyond the second transition boundary. Between the two boundaries, visual detail is progressively diminished from the first boundary towards the second.

In the preferred embodiment of the invention, using a colour television display, the area obscured by cloud, or ground fog as the case may be, has the characteristic hue associated with cloud or ground fog, respectively.

Figure 2:
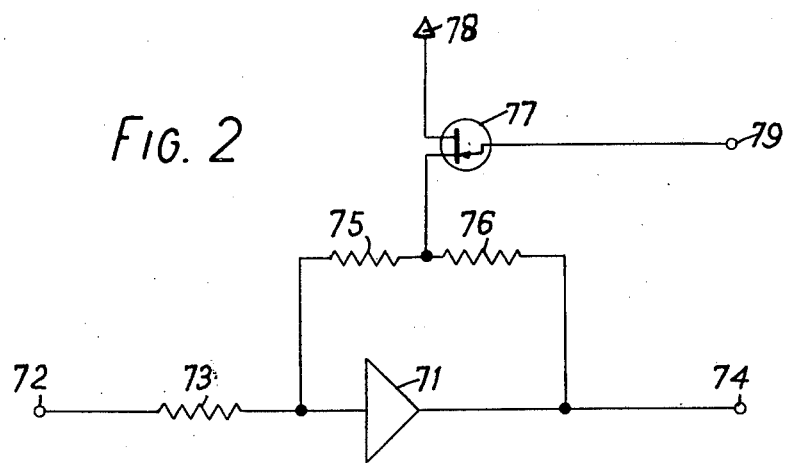
FIG. 2 is a schematic circuit diagram of a variable-gain signal amplifier.
Figure 3A:
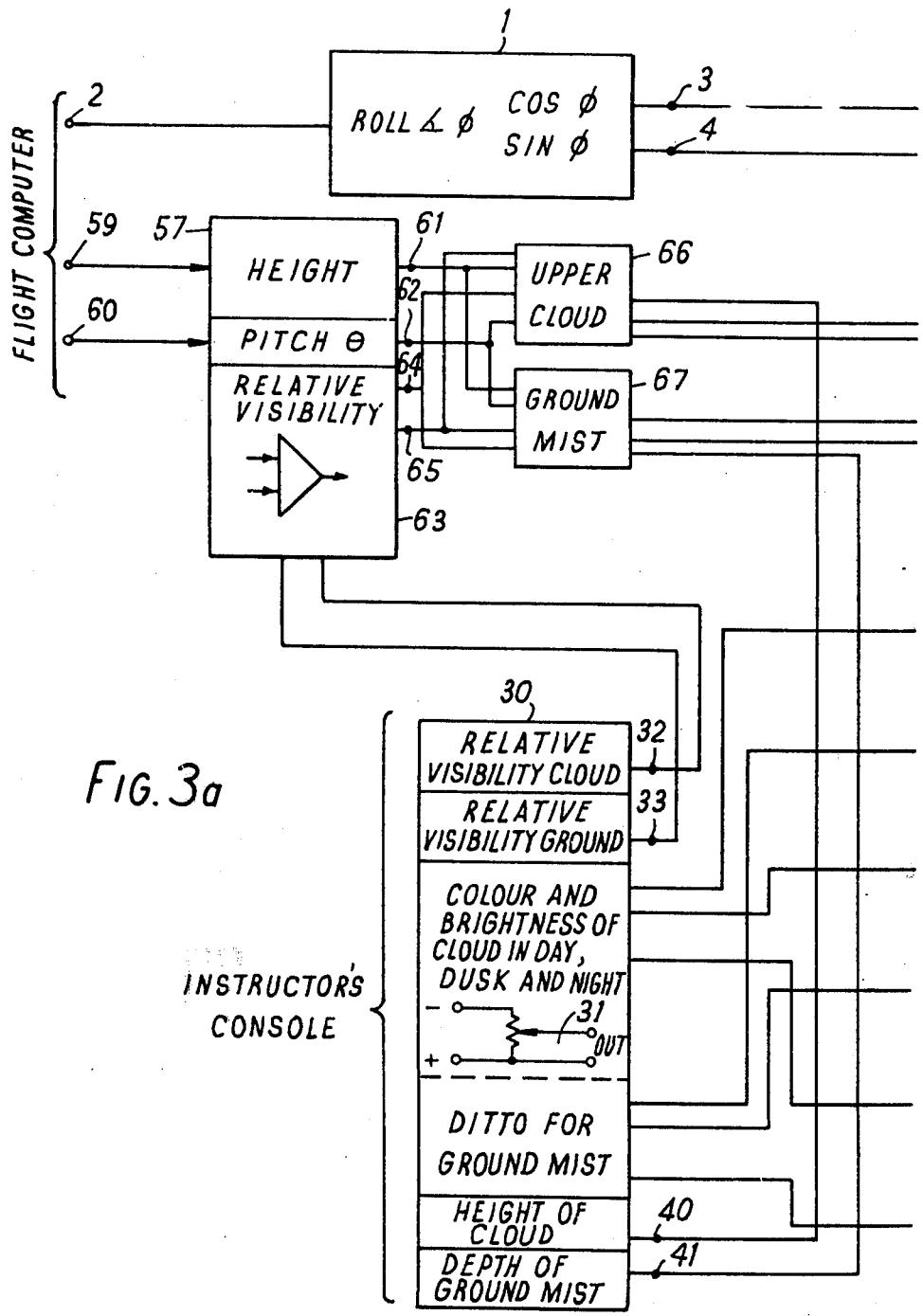
Figure 3B:
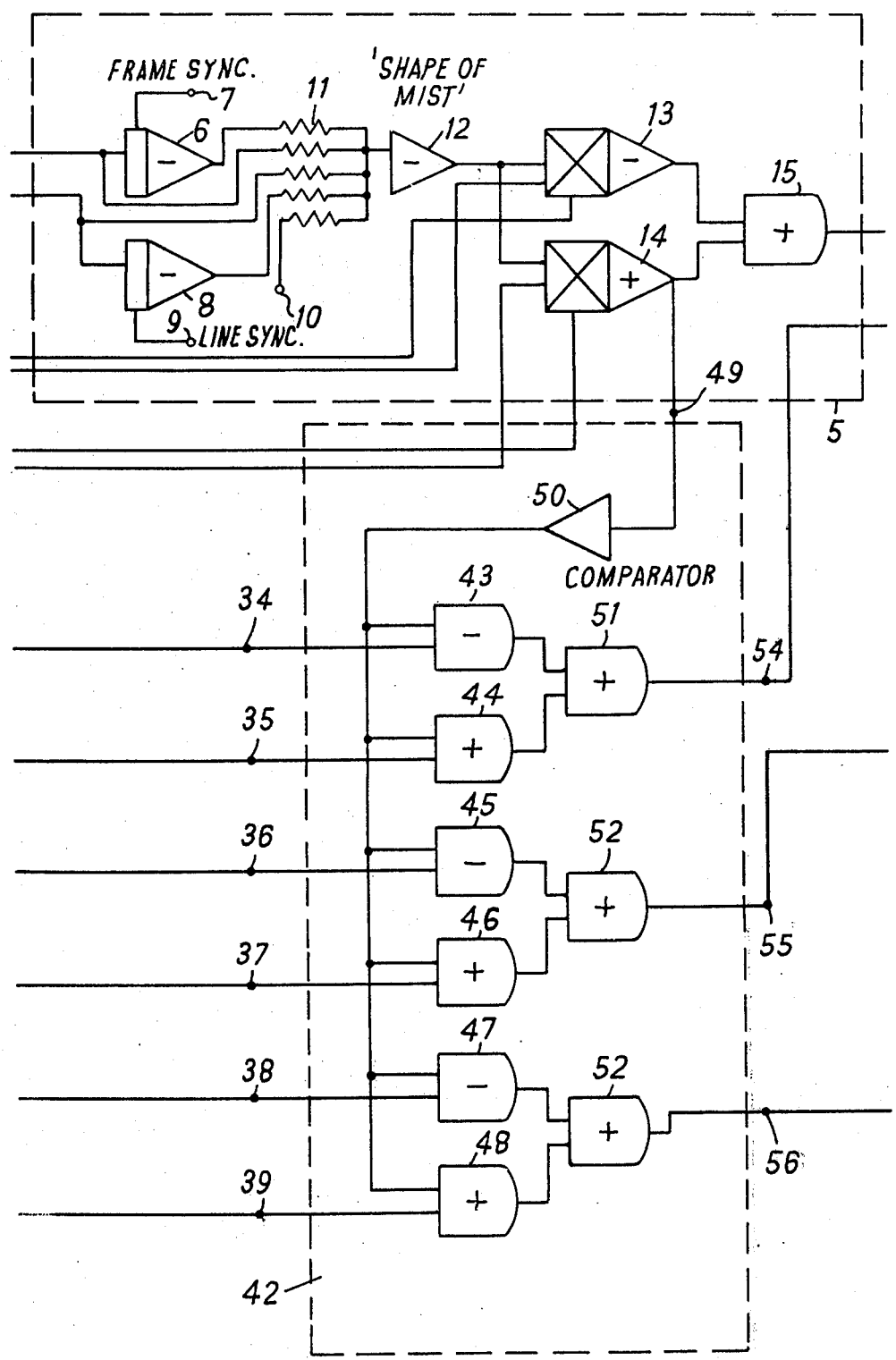

FIG. 2 shows one form of variable gain amplifier of which a number are used in the circuit arrangement of FIG. 3.

The variable gain amplifier of FIG. 2 has an amplifier 71 having an input terminal 72, connected by way of a resistor 73, and an output terminal 74. Negative feedback is provided by way of a T-network including a series connected pair of resistors 75 and 76. A field effect transistor, F.E.T., 77, or equivalent solid state device, has one end connected to the junction of resistors 75 and 76 and the other end connected to baseline. The gate electrode is connected to a terminal 79 to which a gain control potential is applied.

FIG. 3 shows a preferred form of the invention. In the circuit arrangement there shown, a sine/cosine resolver 1 has an output representative of aircraft roll angle $\phi$ from the associated flight computer at input terminal 2. D.C. outputs corresponding to the cosine and the sine of roll angle O are provided at output terminals 3 and 4, respectively, and supplied to a "Shape of mist" function generator 5, shown within the broken line rectangle.

Alternatively, the cos $\phi$ and sin $\phi$ inputs may be derived directly from the flight computer, if they are there available.

The function generator 5 comprises an integrator 6 having the cos $\phi$ input at terminal 3 and the television scan frame synchronizing pulse input at terminal 7. An integrator 8 has the sin $\phi$ input at terminal 4 and the scan line synchronising pulse input at terminal 9.

An integrator 12 has five inputs by way of scaling resistors 11 from the sources shown and from a y terminal 10.

The output of integrator 12 is supplied to an "Upper cloud" variable gain amplifier 13 and a "Ground mist" variable gain amplifier 14. The outputs of the amplifiers 13 and 14 are combined in an analogue "And" gate, that is a voltage controlled attenuator, 15.

The output from the analogue "And" gate 15 at terminal 16 is supplied to "Green" "Red" and "Blue" pairs of variable gain amplifiers 17, 18; 19, 20 and 21, 22, respectively.

The Green, Red and Blue channel signals of the television visual display, derived from the colour television camera viewing a scale model of the terrain being flown over in this example, are supplied to input terminals 68, 69, and 70, respectively.

The pairs of amplifiers 17, 18; 19, 20 and 21, 22, provide inputs of summing amplifiers 23, 24 and 25, respectively. These summing amplifiers provide output signals to the "Modified Green", "Modified Red" and "Modified Blue" output terminals 26, 27 and 28, respectively.

Manually set-in data is provided by an Instructor's console shown generally at 30. This console has manually set potentiometers, as exemplified by the inset diagram 31. Each potentiometer is connected across a D.C. supply and has an output between the positive supply terminal and the potentiometer slider. Ten D.C. outputs are thus provided representing values of the following conditions:

| 32 | Relative Visibility of Cloud; |
| 33 | Relative Visibility of Ground; |
| 34 | Colour and Brightness of Cloud - Day; |
| 35 | Colour and Brightness of Cloud - Dusk; |
| 36 | Colour and Brightness of Cloud - Night; |
| 37 | Colour and Brightness of Ground Mist - Day; |
| 38 | Colour and Brightness of Ground Mist - Dusk; |
| 39 | Colour and Brightness of Ground Mist - Night; |
| 40 | Height of Cloud; |
| 41 | Depth of Ground Mist. |

These values appear at terminals 32 to 41, respectively, as indicated by the prefixed numeral in the above table.

The six D.C. values appearing at terminals 34 to 39, inclusive, are supplied to a "Bright-up" logic network shown generally at 42. Thus, the values at terminals 34 to 39 are supplied to analog "And" gates 43 to 48, respectively, together with the output signal from variable gain amplifier 14 of the function generator 5, which appears at terminals 49 and is supplied to the gates 43 to 48 by way of a comparator 50.

The outputs of the gate pairs 43, 44; 45, 46 and 47, 48 are supplied to analog "And" gates 51, 52 and 53 respectively. The outputs of these latter gates appear at terminals 54, 55 and 56, respectively, and are fed to the varible gain amplifiers 18, 20 and 22, respectively, of the Green, Red and Blue colour channels respectively.

The output values from the Instructor's console 30 appearing at terminals 30, 32 and 40, 41 are combined with data derived from the associated flight computer in order to provide the required input data to the function generator 5. Thus, an "Aircraft height" D.C. signal generator 57 and an "Aircraft pitch" D.C. signal generator 58 derive input values from the associated flight computer at inputs 59 and 60, respectively, and supply output values to terminals 61 and 62, respectively.

A "Relative Visibility" summing amplifier 63 receives inputs from terminals 32 and 33 and supplies output signals at terminals 64 and 65.

The signals at all terminals 61, 62, 64 and 65 are supplied to "Upper Cloud" and "Ground Mist" summing amplifiers 66 and 67, which provide output signals to the summing amplifiers 13 and 14, respectively, of function generator 5.

Before describing the practical functioning of the arrangement of FIG. 3 in detail, it will assist understanding to explain the theoretical requirements of the system.

Considering FIG. 1, again, the two boundaries E, F, G. and J. K. L. are parallel and are to be rotated about the picture centre O as a function of the aircraft simulated roll, that is, in synchronism with the television camera roll.

The boundaries E, F, G. which is the effective 'start' of the decreasing visibility, is to be moved across the screen. The aircraft attitude values which produce changes of height and pitch, are used to compute a correct function to locate line E, F, G.

The rate of change of the visibility within the transition, region, G, E, J, L, is to be controlled by external control signals from the Instructor's console.

The cloud (or fog) colour and the colour intensity are set by the blank levels of the Red, Green and Blue signals in the cloud area.

Ground fog is similarly controlled as a simple inversion. Both conditions can be produced simultaneously, if required, when four boundary lines will be involved.

The considerations for deriving a function to provide a rotating boundary line are as follows:

Considering the image area A, B, C, D of FIG. 1 and the modulation of the image in three rectangular axes, then:

$x$ = horizontal (line) direction
$y$ = vertical (frame) direction
$z$ = video gain (modulation).

If the full scale line and frame directions are unity, then the centre of the picture will have co-ordinates (½,½,0). If the origin of the co-ordinate axes are shifted to the top left hand corner, A of FIG. 1, then:

$$x' = x - ½$$

$$y' = y - ½$$

$$z' = z$$

Rotating the co-ordinate axes about the $z$-axis by an angle $\phi$ gives:

$$x'' = x \cos \phi - y \sin \phi$$

$$y'' = x \sin \phi + y \cos \phi$$

$$z'' = z$$

If the video gain $z$ is varied from 0 at $y = ½$ to full gain 1 at $y = -½$ with no variation along the $x$-axis, the equation of the plane is then:

$$z = ½ - y$$

If the slope of the plane is to be variable, but with the same $y$-axis cross-over point, the equation has the form:

$$z = m (½ - y)$$

where $m$ = slope or gradient

If the required zero crossing point of the $y$-axis is variable and has a value $y_1$, then:

$$z = m(y_1 - y).$$

If this plane is now translated to co-ordinates (½,½,0) and rotated through angle $\phi$ about the $z$-axis the transformed equation becomes:

$$z = m[y_1 - (x - ½) \sin \phi - (y - ½) \cos \phi]$$

The generation of the function to produce the required visibility simulation is accomplished in the system described with reference to FIG. 3.

Referring now to FIG. 3, the integrator 8 receives a D.C. input proportional to sin $\phi$, where $\phi$ is the aircraft roll angle as stated. The television line synchronising pulse is applied to the integrator clamp at terminal 9. The output from the integrator 8 is a linear sawtooth, where amplitude is proportional to sin $\phi$.

If the line time base (or sweep) is given by $x = K_L t$, then the output from the integrator 8 is proportional to $x \sin \phi$.

Smilarly the integrator 6 has a D.C. input proportional to cos $\phi$ and the television frame synchronising pulse is fed to the integrator clamp at terminal 7. Hence the sawtooth output from integrator 6 has an amplitude proportional to cos $\phi$. If the frame time-base is given by $y = K_F t$, then the output from the integrator 6 is proportional to $y \cos \phi$.

The outputs from the integrators 6 and 7 are summed with sin $\phi$/cos $\phi$ and $y_1$ in the amplifier 12. This produces the required function:

$$z = m[y_1 - (x - ½) \sin \phi - (y - ½) \cos \phi]$$

The video level is required to vary between zero up to full positive gain. The amplifier 13 has clamps which operate at 0 Volt and at the maximum video amplitude. Also, the gain $m$ is set by a feedback network which can be varied.

This is conveniently achieved by using a F.E.T. device in the arm of a T-network, feedback arrangement, as described earlier with reference to FIG. 2.

If a ground fog effect is required, the slope is opposite to that of cloud, or "sky fog". A second channel thus has to be provided with an inverter and variable gain summing amplifier 14. These have, separately, controlled offset value $y_2$ and slope $m_2$.

These two functions are then added in an analogue 'AND' gate 15 with the line blanking pulses. The latter is necessary to give a fixed 'blank' level for the clamping circuits to operate on to prevent bright-up during the line fly-back.

The resultant control signal is then used to vary the gain of (i) the video bright-up channels 17, 19 and 21, and (ii) cloud (or fog) bright-up channels 18, 20 and 22.

Referring again to FIG. 1, and considering cloud conditions:

i. In the area C, D, E, G, we have full video gain and zero cloud/fog gain;

ii. In the area G, E, J, L, the video gain is progressively reduced whilst the cloud/fog gain increases; and iii. In the area L, J, A, B, the video gain is zero and the cloud/fog gain is maximum.

The video and cloud/fog bright-up signals for Red, Green and Blue channels are then mixed in the three amplifiers 23, 24 and 25 and are applied to the television visual system via output driving amplifiers; supplied from terminals 26, 27 and 28.

An additional feature provided in the system of FIG. 3 allows the hue and colour intensity of the cloud/fog to be controlled. The controlling signals, D.C. voltages, for each colour cloud and ground fog are fed by way of analogue gating circuits 43 to 48, inclusive. A comparator 50 switches its output as soon as a fog level signal is detected at its input. The outputs of the switched gates 43 to 48 are then fed to mixer gates 51, 52 and 53, inclusive, and then to the bright-up amplifiers at terminals 54, 55 and 56.

Figure 4:
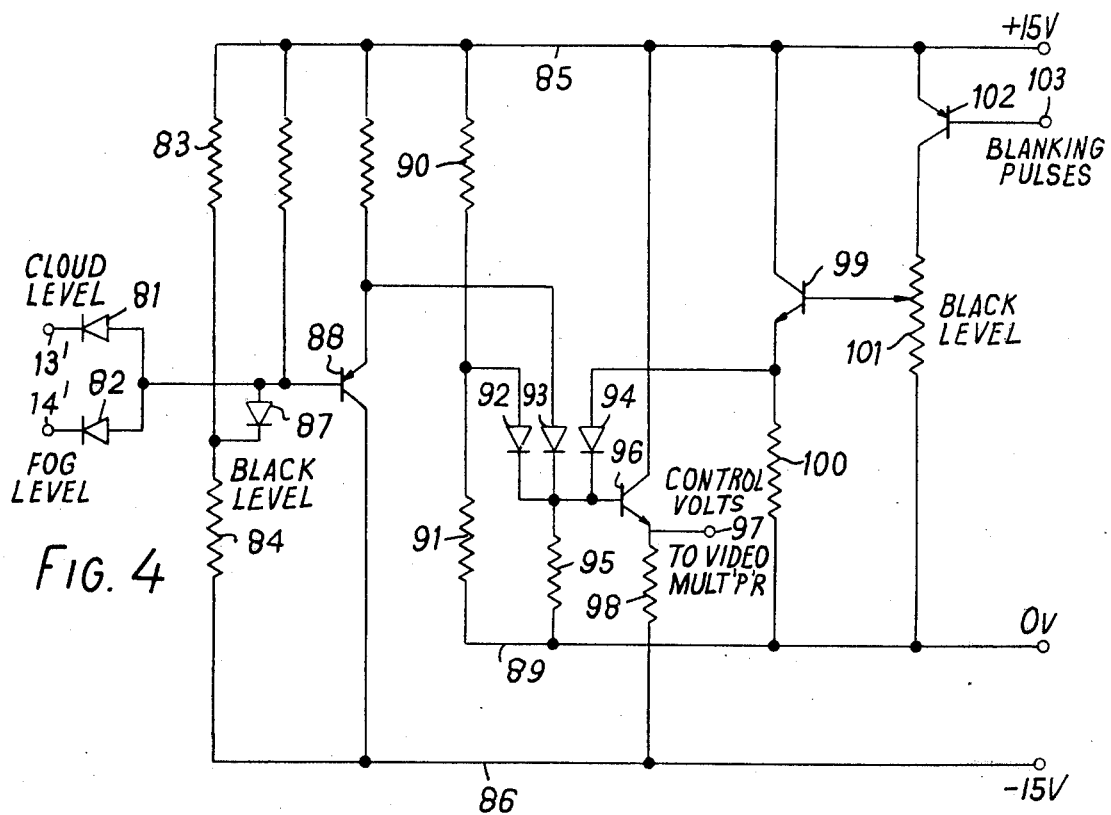
FIG. 4 is a schematic circuit diagram of an analog And gate such as is used in the circuit of FIG. 3.

FIG. 4 is a schematic circuit diagram of an analogue "And" gate, such as is used for the elements 15, 43 to 48 and 51 to 53 of the arrangement of FIG. 3. The reference numerals shown correspond particularly to the "And" gate 15 of the function generator 5 of FIG. 3.

A pair of input terminals 13' and 14' receive signals, respectively, from the "Upper cloud" variable gain amplifier 13 and "Ground mist" variable gain amplifier 14. Each input includes a series diode 81 and 82, respectively. The input signals are referenced to an input "Black level" determined by a potentiometer 83, 84 connected between the +15 volt line 85 and the −15 volt line 86. The input signal line is connected to the potentiometer tap, by way of diode 87, and to the base of a transistor 88.

A "Maximum brightness" level is determined by a potentiometer 90, 91 connected between the +15 volt line 85 and the zero volt line 89. A diode 92 is connected to the potentiometer tap and by a resistor 95 to the zero volt line 89. The function of diode 92 and resistor 95 is connected to further diodes 93 and 94 and to the base of transistor 96.

Diode 93 is connected from the emitter output of transistor 88. Diode 94 is connected to the emitter of a transistor 99.

The emitter of transistor 96 is connected by load 98 to the −15 volt line 86 and, by way of terminal 97, to supply a gain control voltage to the radio multiplier of the associated television system.

The transistor 99 has its base connected to the slider of a variable potentiometer 101 to enable the output "Black level" to be preset thereby.

The potentiometer 101 is connected in the collector circuit of a transistor 102 between the +15 volt line 85 and the zero volt line 89. Blanking pulses are provided at terminal 103 which is connected to the base of transistor 102.

Figure 5:
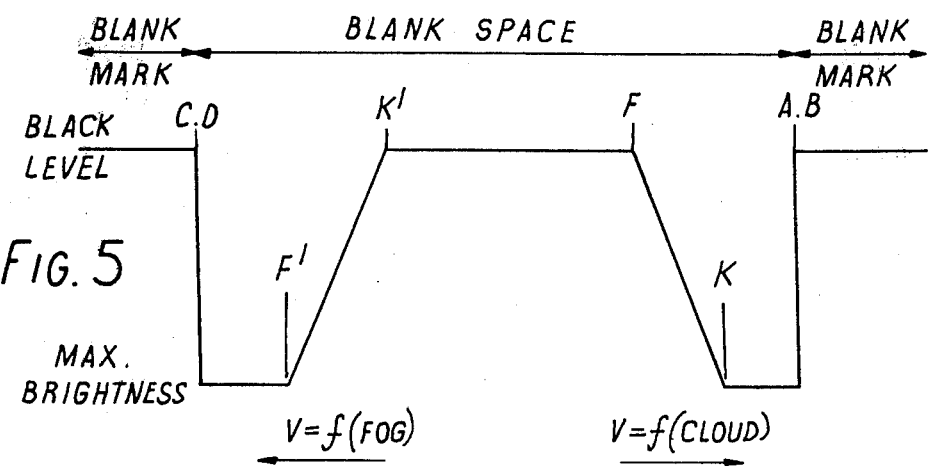
FIG. 5 is a diagram showing image visibility along an arbitrary vertical line across the visual display picture area.

FIG. 5 is a diagram showing the "Cloud" and "Mist of Fog" image levels at the output of the analog "And" gate 15 of FIG. 4 under conditions of simulated low cloud and simulated ground mist or fog. The right hand side of the diagram represents the top of the picture area A, B of FIG. 1 and the left hand side represents the bottom of the picture area C, D of FIG. 1. The "Maximum brightness" level, determined by potentiometer 90, 91 of FIG. 4, is shown as the base of the diagram and the "Black" level, determined by potentiometer 101 of FIG. 4 is shown as the top. These levels refer to the "Cloud" and "Mist or Fog" signal levels and are the inverse of the image levels of the full-detail visual display.

Thus, FIG. 5 shows four boundary lines referenced K, F, K' and F', respectively, from the top of the picture area to the bottom, defining a central area of clear visibility F, K', an upper area A, B to K obscured by cloud, a transitional area of improving visibility from K to F, a traditional area of worsening visibility from K' to F' and a lower area F' to CD obscured by ground mist or fog.

The blanking pulses at terminal 103 have a Mark-Space configuration giving a Space between the picture area limits A, B and C, D and a Mark outside the picture area.

We claim:

1. In ground-based flight simulation apparatus including a dummy cockpit and associated flight computer and visual display means including a television system for producing a scanned image in a picture area visible from said cockpit, the improvement comprising circuit means for providing a control signal for controlling the television picture visibility during the line and frame scanning of said image so as to produce first, second, third and fourth boundaries spaced apart within the picture area of said scanned image and to thereby define first, second, third, fourth, and fifth visibility zones, controlled-gain signal amplifier means for providing a full-visibility visual image in the picture area of the third zone defined between the second boundary and third boundary, zero-visibility visual images in the picture areas of the first and fifth zones lying outside of said first boundary and outside of said fourth boundary, respectively, and progressively reduced visibility visual images in the picture areas of the second and fourth zones extending from said second boundary to said first boundary, and from said third boundary to said fourth boundary, respectively, and circuit means controlled from the flight computer for rotating all of said boundaries about the center of the picture area in accordance with computed aircraft roll and for displacing said first and second boundaries and said third and fourth boundaries in accordance with computed aircraft pitch and height, so as to vary the separation between said first boundary and said second boundary and the separation between said third boundary and said fourth boundary and thus adjust the widths of said second and fourth zones of progressively reduced visibility visual images.

2. In ground-based flight simulation apparatus including a dummy cockpit for housing trainee crew, dummy flight controls operable by the said crew, an associated flight computer, responsive to the setting of said flight controls, for computing data relative to a simulated flight exercise therefrom, visual display apparatus including a terrian model, a closed circuit color television camera for viewing said model, motor means for moving said camera relatively to said model, and television display means for displaying a scanned color television image for viewing by said trainee crew, the improvement comprising circuit means for providing a control signal for controlling the television picture visibility during the line and frame scanning of said image so as to produce first, second, third and fourth boundaries spaced apart with said scanned image and to thereby define first, second, third, fourth and fifth visibility zones, controlled-gain signal amplifier means for providing a full-visibility visual image in the picture area of the third zone defined between the second boundary and third boundary, zero-visibility visual images in the picture areas of the first and fifth zones lying outside of of said first boundary and outside of said fourth boundary, respectively, and progressively reduced visibility visual images in the picture areas of the second and fourth zones extending from said second boundary to said first boundary and from said third boundary to said fourth boundary, respectively, and further circuit means controlled from said flight computer for rotating all of said boundaries about the center of the picture area in accordance with computed aircraft roll and displacing said first and second boundaries and said third and fourth boundaries in accordance with computed aircraft pitch and height, so as to vary the separation between said first boundary and said second boundary and the separation between said third boundary and said fourth boundary and thus adjust the widths of said second and fourth zones of progressively reduced visibility visual images.

3. Ground-based flight simulation apparatus including a dummy cockpit for housing trainee crew, dummy flight controls operable by the said crew, an associated flight computer, responsive to the setting of said flight controls, for computing therefrom data relative to a simulated flight exercise, visual display apparatus including a terrain model, a closed circuit color television camera for viewing said model, motor means for moving said camera relatively to said model, and television display means for displaying a scanner color television image for viewing by said trainee crew, said apparatus further comprising circuit means for providing a control signal for controlling the television picture visibility during the line and frame scanning of said image for defining first, second, third, and fourth boundaries spaced apart on said scanned image, controlled-gain signal amplifier means for providing a full-visibility visual image in the picture area between said second and third boundaries, zero-visibility visual images in the picture area lying outside said first and fourth boundaries, and progressively reduced visibility visual images from said second boundary to said first boundary defining a first visibility transision region and from said third boundary to said fourth boundary defining a second visibility transition region, respectively, circuit means, controlled from said flight computer, for rotating all said boundaries about the center of the picture area in accordance with computed aircraft roll and for displacing at least said second and said third boundaries in accordance with computed aircraft pitch and height so as to adjust the widths of said first and second visibility transition regions, said controlled-gain signal amplifier means including a first controlled-gain amplifier channel carrying signals related to "upper cloud" simulation and a second controlled-gain amplifier channel carrying signal related to "ground mist or fog" simulation.

4. Ground-based flight simulation apparatus as claimed in claim 3, including a source of first, second, third and fourth signals, each of manually adjustable amplitude, respectively defining "relative visibility cloud", "relative visibility ground", "height of cloud" and "depth of ground mist", said first and second signals being provided to a first summing amplifier for deriving an output signal defining "relative visibility", second and third summing amplifiers both supplied with said "relative visibility" signal and with signals defining aircraft height and aircraft pitch, said second summing amplifier further receiving said "height of cloud" signal and said third summing amplifier further receiving said "depth of ground mist" signal, said second summing amplifier supplying the output signal thereof to said first controlled-gain amplifier channel and said third summing amplifier supplying the output signal thereof to said second controlled-gain amplifier channel.

5. Ground-based flight simulation apparatus as claimed in claim 4, wherein each of said first and second controlled-gain amplifiers supplies signals to "Green", "Red" and "Blue" channels of a color television display, said apparatus further including a source of fifth and sixth signals, both of manually adjustable amplitude, respectively defining "color and brightness of cloud" and "color and brightness of ground mist", said fifth and sixth signals being supplied to three signal comparator channels and thence to said "Green", "Red" and "Blue" television channels.

* * * * *